United States Patent Office 3,636,040
Patented Jan. 18, 1972

3,636,040
COMPLEX COMPOUNDS OF THE COBALT-PHTHALOCYANINE SERIES
Heinrich Vollmann, Leverkusen, and Peter Mertens, Cologne, Marienburg, Germany, assignors to Farbenfabriken Bayer Aktiengesellschaft, Leverkusen, Germany
No Drawing. Filed Aug. 28, 1968, Ser. No. 755,826
Claims priority, application Germany, Aug. 31, 1968,
F 53,375
Int. Cl. C09b 47/04
U.S. Cl. 260—314.5                      16 Claims

ABSTRACT OF THE DISCLOSURE

Coordinatively hexavalent complex salts of trivalent cobalt, in which four of the six coordination points at the cobalt atom are occupied by the phthalocyanine ring system which has a double negative charge, and each of the remaining two points is occupied by an amine and process for preparing said complex salts comprising treating cobalt-phthalocyanines with an oxidizing agent in the presence of an anion and with an amine. The complex salts can be used as dyestuffs for lacquers, synthetic materials and pastes for ball point pens.

---

The present invention concerns a process for producing complex compounds of the cobalt-phthalocyanine series. More particularly it relates to a process wherein complex compounds of the phthalocyanine series are obtained by treating optionally substituted cobalt-phthalocyanines (a) with oxidising agents in the presence of anions and (b) with amines.

In the process according to the invention the oxidising agents and the amines are used in any desired sequence. It is possible to cause at first the oxidising agents to react and then the amines or at first the amines and then the oxidising agents or both agents simultaneously. The expedient sequence of process steps depends on the reaction components and the solvents used and can easily be ascertained by preliminary experiments. The preferred processes are those which do not require isolation of the intermediates.

Besides cobalt-phthalocyanine substitution products of cobalt-phthalocyanine can also be used, for example, cobalt-phthalocyanine compounds which are substituted in the benzene radicals by phenyl, halogen or lower alkoxy groups, such as methoxy and ethoxy groups.

As oxidising agents there may be used, for example, oxygen, air, halogens, such as chlorine, bromine or iodine, or nitric acid. If no halide or nitrate ions are formed by the oxidation, compounds containing such anions must be added, for example, ammonium chloride or ammonium bromide. If halogens or halogenating agents, such as thionyl chloride, sulphuryl chloride, sulphur dichloride, sulphur monochloride, phosphorus oxychloride and phosphorus pentachloride, are used as oxidising agents, the process is preferably carried out in dispersing agents and the halogens respectively the halogenating agents are allowed to react until the starting material is practically completely reacted. The reaction with halogen will be expediently carried out under such reaction conditions, for example in the absence of halogenating catalysts and at temperatures below 80° C., that halogen does not yet enter the hydrocarbon radicals to a noticeable extent. If nitric acid is reacted, it is expedient to work at temperatures in the vicinity of room temperature. In this operation approximately two moles nitric acid react with one mole cobalt-phthalocyanine.

As anions, there may be used the anions of inorganic acids, such as hydrohalic acids, nitric acid or carbonic acid, as well as of organic acids, such as acetic acid. The following anions may be mentioned as examples: $Cl^-$, $Br^-$, $I^-$, $HCO_3^-$, $CH_3COO^-$ and $OH^-$. The presence of at least one mole of the anion per mole cobalt-phthalocyanine is of advantage.

Suitable amines are, besides ammonia:

aliphatic monoamines, such as methyl-, ethyl-, diethyl-, triethyl-, i-propyl-, n-butylamine, N-methyl-ethanolamine and 1-dimethylamino-propanol-2, cycloaliphatic monoamines, such as cyclohexylamine, araliphatic monoamines, such as benzyl- and N,N-dimethyl-benzylamine, aromatic monoamines, such as aniline, p-toluidine and p-anisidine, heterocyclic monoamines, such as 2-aminothiazole and 2-aminopyridine, 1-amino-3-imino-isoindolenine, cyclic amines, such as morpholine, piperidine, N-methyl-piperazine, pyridine and 2-methyl-imidazole, furthermore polyamines, such as ethylene-diamine, tetramethyl-ethylene-diamine, 1,3-diamino-propane, bis-(3-aminopropyl)-amine, bis-(3-aminopropyl)-methylamine and especially the diamines of the formula

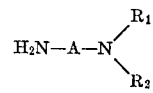

wherein denote:

A a straight or branched $C_2$–$C_5$-alkylene radical,
$R_1$ hydrogen or a $C_1$–$C_4$-alkyl radical and
$R_2$ a $C_1$–$C_4$-alkyl or a cyclohexyl radical.

As examples for the diamines of the above formula are mentioned: 1amino-2-dimethylamino-ethane, 1-amino-3-methylamino-propane, 1-amino-3-cyclohexylamino-propane and especially 1-amino-3-dimethylamino-propane and 1-amino-3-diethylamino-propane.

The reaction with the amines can also be carried out in dispersing agents, such as nitrobenzene, monochlorobenzene, dichlorobenzene or trichlorobenzene, chloroform or carbon tetrachloride, or in an excess of the amines.

If the reactions are carried out successively, it is not necessary to use the isolated intermediate of the first reaction; in general the reaction mixture obtained can be immediately used for the second reaction.

The products obtained according to the invention are complex compounds of cobalt-phthalocyanines. In the case where cobalt-phthalocyanine is reacted with chlorine, followed by a reaction with ammonia, the process according to the invention can be illustrated by the following equation:

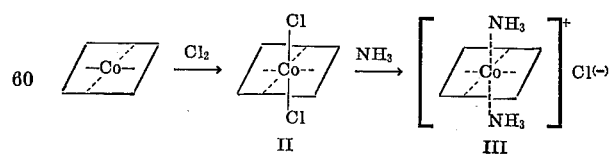

In the above equation there have been used simplified structural formulae in which the rhomb either denotes a phthalocyanine ring system (A), if two fully drawn valency lines lead from the central atom to the rhomb, as in Formulae I and III, or denotes a cyclotetra-iminoisoindolenyl system (B), if principal valencies from the central atom to the rhomb are missing, as in Formulae II.

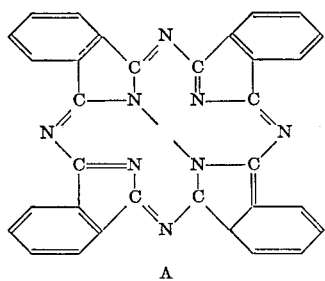

A

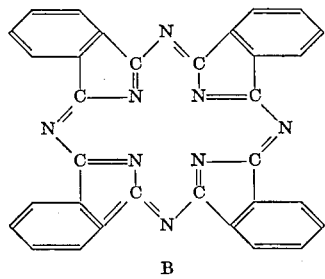

B

If in the second reaction step, i.e. starting from dichloro-CoPc (II), the amminia is replaced with e.g. 1-amino-3-dimethylamino-propane, then there is obtained a compound the structure and composition of which are characterised by the following formula

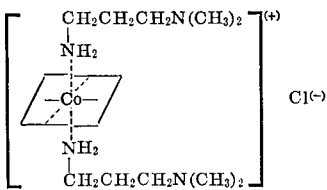

Insofar as the CoPc complexes prepared according to the invention are soluble in lacquer solvents, they can be used as dyestuffs for lacquers and synthetic materials as well as for pastes for ball point pens.

The compounds obtained according to the invention are coordinatively hexavalent complex salts of trivalent cobalt, in which four of the six coordination points at the cobalt atom are occupied by the phthalocyanine ring system which has a double negative charge, and each of the remaining two points is occupied by an amine from the series of primary, secondary or tertiary mono- and polyamines, and which contain an anion, such as $Cl^{(-)}$, $Br^{(-)}$, $I^{(-)}$, $OH^{(-)}$, $NO_3^{(-)}$, $HCO_3^{(-)}$, and $CH_3COO^{(-)}$.

In the examples, CoPc denotes cobalt-phthalocyanine. RZ is the reduction number. This number indicates how many grams CoPc can be obtained under optimal reaction conditions from 100 g. of a CoPc complex containing further ligands bound to the metal. If the molecular weight of the complex is known, this number can also be found by calculation. If not otherwise stated the parts given in the examples are parts by weight.

EXAMPLE 1

(a) 571 parts CoPc are suspended in 2600 parts by volume of dry o-dichlorobenzene in a closed vessel of 5000 parts by volume capacity, which is fitted with a stirrer. About 2000 parts by volume chlorine are rapidly passed through the gas space above the suspension with the stirrer at a standstill, the vessel is then closed, and the stirrer is slowly started. The resulting low pressure is continuously compensated by the addition of chlorine, and the reaction temperature is kept at a maximum of about 30° C. by external cooling. The chlorine adsorption comes to a standstill after about 1½ hours and a chlorine consumption of about 80 parts chlorine. The brown, finely crystalline reaction product is filtered off with suction, washed with benzene or carbon tetrachloride and the filter cake is dried in a vacuum or circulating air cabinet at 60–100° C. Yield of dichloro-CoPc: about 670 parts ∼104 percent of theory. Chlorine content about 11.4 percent.

RZ found: 88.5. RZ calculated for $C_{32}H_{16}N_8CoCl_2$: 89

(b) 32.5 parts dichloro-CoPc obtained according to Example 1(a) are suspended in 180 parts by volume o-dichlorobenzene in a flask fitted with stirrer, gas feed tube and thermometer, and 4.5 parts ammonia are passed into the closed vessel. The reaction is slightly exothermic. Stirring is continued for one hour, the excess ammonia is driven off by passing dry air over the suspension, the product is filtered off with suction and washed with benzene. After drying at 40° C. in a vacuum, 35.6 parts of a finely crystalline, dark blue-green powder are obtained. For purification, this raw complex is dissolved in methanol, the solution is filtered and the pure complex is precipitated from the clear blue-green solution as trihydrate in crystalline form by the addition of an aqueous ammonium chloride solution. It dissolves in lower alcohols, formamide and pyridine with an intensely blue-green colour. empirical formula:

$C_{32}H_{28}N_{10}O_3CoCl$; mol weight 695. Calculated (percent): C, 55.3; H, 4.1; N, 20.1; Cl, 5.1; Co, 8.5. Found (percent): C, 55.3; H, 3.8; N, 20.2; Cl, 4.7; Co, 8.1; RZ calculated, 82.1. RZ found, 81.8.

(c) If the ammonia is added to the mixture described above in the form of 60 parts by volume of a 10% methanolic ammonia solution and the mixture is gently boiled under reflux for 25 minutes, a similar green diamine complex crystallises in the form of metallic-shining prisms and can be isolated by filtering off with suction, washing with a little methanol and subsequent drying at 50° C. in a vacuum. It is free from water of crystallisation but contains 1 mole methanol of crystallisation, the structure being otherwise the same.

EXAMPLE 2

(a) To the suspension of 25 parts dichloro-CoPc, obtained according to Example 1(a), in 100 parts by volume methanol are added dropwise 20 parts aniline. The temperature of the suspension rises to 38° C. The mixture is stirred cold, the product is filtered off with suction and washed first with a little methanol and then thoroughly with water. After drying at 40° C. in a vacuum, there are obtained 25.2 parts (82% of theory) of a violet-black crystalline powder which exhibits its specific green colour when triturated. The compound dissolves in lower alcohols, formamide and pyridine with a green colour.

Empirical formula: $C_{44}H_{30}N_{10}CoCl$; mol weight 793. Calculated (percent): C, 66.6; H, 4.8; N, 17.7; Co, 7.4; Cl, 4.5. Found (percent): C, 66.4; H, 4.0; N, 17.6; Co, 6.9; Cl, 4.8. RZ calculated, 72.1. RZ found, 70.0.

(b) Products with very similar properties are obtained when the 20 parts aniline are replaced with equimolecular amounts of n-butylamine, benzylamine, ethanolamine, morpholine or 2-methyl-imidazole.

EXAMPLE 3

When 45.68 parts of pure CoPc (0.08 mole) are stirred with about 900 parts by volume pyridine at a temperature gradually rising to 70° C., then the material partially dissolves with a blue colour. At 50–60° C., ample amounts of blue transparent rhombs are observed in the mixture under the microscope, besides the opaque coarse needles of the starting material. The former presumably are a CoPc-monopyridine complex. Further stirring at 60–70° C. leads to the complete disappearance of the rhombs as well as of the starting material, and uniform, rather long, greenish blue, transparent, flat prisms of a CoPc-dipyridine complex precipitates. The time required for reaching this stage of conversion is ½ hour to about 2 hours, depending upon the degree of dispersion of the starting material. After cooling to 20° C., the product is filtered off with suction, washed once with a little pyridine, and then thoroughly with water. The filter cake which has a strong red shine is first predried at 45° C., then dried at 60° C. for 2 hours.

The yield of 58 parts corresponds to a yield of 99% of the theoretical amount of dipyridino-CoPc (empirical formula: $C_{42}H_{26}N_{10}Co$; molecular weight 730). This is in accordance with the data obtained from elementary analysis and with the result of a quantitative thermal decomposition of tthe splendidly crystallised complex. From 10.00 g. of this complex there remain 9.75 g. after drying for 2 hours at 80° C., 9.7 g. after drying at 80° C. for 4 hours, 8.45 g. after drying at 100° C. for 16 hours, constant weight being achieved only after 2 hours at 120° C. with 7.75 g. The RZ of 77.5 thus determined corresponds quite accurately to the calculated RZ of 78.5.

20 parts CoPc are stirred in 500 parts by volume pyridine at 25° C. for 20 minutes. To the mixture are then added rapidly 18 parts by weight bromine. After further stirring for 4 minutes, the resulting deep green solution is rapidly filtered with suction through a round filter and the small residue (1.2 parts not reacted CoPc) is washed with a little pyridine.

The blue-green pyridine solution and the wash pyridine are combined and then heated with stirring. At 40° C., fine partly also coarser needles crystallise which are blue-green transparent under the microscope, and which redissolve at 80° C. to give a clear solution. A new crystallisation occurs at 90° C., this time of uniform hexagonal leaflets. After further stirring at 90° C. for two hours, the mixture is cooled to 40° C., the product is filtered off with suction, thoroughly washed twice with pyridine and then with methanol, and dried at 100° C. until the weight is constant. Yield: 24.2 parts of a dark green crystal powder=91% of theory, referred to consumed CoPc (18.8 parts).

Empirical formula: $C_{42}H_{26}N_{10}BrCo$; mol weight 810. Calculated (percent): C, 62.26; H, 3.24; N, 17.31; Br, 9.92; Co, 7.29. Found (percent): C, 61.8; H, 3.5; N, 17.1; Br, 10.1; Co, 7.1. RZ calculated, 70.5. RZ found. 70.5.

EXAMPLE 4

64.2 parts (0.1 mole) dichloro-CoPc obtained according to Example 1(a) in the form of a powder which should not be too coarse, are introduced at 80° C., while stirring, into 500 parts by volume 1-amino-3-dimethyl-amino-propane. The dichloro-CoPc dissolves with a deep yellow-green colour. By controlling the velocity of introduction and, if necessary, by external cooling, care is taken that the temperature of the mixture does not rise above about 95° C., and stirring is continued at 80–90° C. for about 15 minutes. Dark coarse needles precipitate while the solution acquires a brownish yellow colour. After cooling to 40° C., the product is filtered off with suction, rinsed with filtrate, thoroughly filtered off with suction and washed with water until the run-off which initially is still brownish, has become water-clear. The residue is dried in a vacuum at 40° C. while a weak air current is sucked through. Yield: 61 parts (=75% of theory) of a dark green crystalline powder which has a reddish shine and dissolves, almost without a residue, in 10 parts of 5% acetic acid with a deep blue-green colour. In the dark, the solution is stable far beyond 24 hours. When it is illuminated in glass vessels, a precipitate of CoPc with a red shine can be seen on the side of the light incidence.

Empirical formula: $C_{42}H_{32}N_{12}ClCo$; mol. weight 810. Calculated (percent): C, 62.1; H, 5.59; N, 20.69; Cl, 4.37; Co, 7.26. Found (percent): C, 61.9; H, 5.67; N, 20.94; Cl, 4.50; Co, 7.4. RZ calculated, 70.5. RZ found, 70.3.

EXAMPLE 5

(a) To the suspension of 25 parts dichloro-CoPc, obtained according to Example 1(a), in 100 parts by volume methanol 13.5 parts 1-amino-3-dimethylamino-propane are added dropwise, whereupon the temperature slightly rises. The mixture is stirred until cold, 100 parts by volume of water are added dropwise, the product is filtered off with suction and washed with water until neutral. After drying at 40° C. in a vacuum, a splendidly crystallised product with a brass lustre is obtained in a good yield. It shows a RZ of 70 and analysis yields the following values:

Calculated (percent): $C_{42}$, 62.10; $H_{43}$, 5.59; $N_{12}$, 20.69; Cl, 4.37; Co, 7.26. Found (percent): $C_{42}$, 62.15; $H_{43}$, 5.57; $N_{12}$, 20.72; Cl, 4.50; Co, 6.60.

The compound is identical with the one described in Example 4. The complex dissolves in lower alcohols, chloroform, foramide, pyridine, nitrobenzene or dilute aqueous formic or acetic acid with a blue-green colour. From the last-mentioned acid it can be reprecipitated, by the addition of hydrohalic acids, nitric acid or nitrous acid or the salts of these acids, almost quantitatively as a salt of the acid concerned.

(b) If the 13.5 parts 1-amino-3-dimethylamino-propane are replaced with 17.5 parts 1-amino-3-diethylamino-propane or with 12.5 parts 1-amino-2-dimethylamino-ethane then completely analogous compounds are obtained, which exhibit the same properties.

EXAMPLE 6

7.5 parts chlorine are passed into the suspension of 57 parts cobalt-phthalocyanine in 300 parts by volume o-dichlorobenzene. Air is then blown through the black-brown suspension, in order to remove any excess chlorine, 35 parts 1-amino-3-dimethylamino-propane are then added, and the mixture is heated to 80–100° C. After cooling to room temperature the product is filtered off with suction, washed with benzene and dried at 60° C. in a vacuum. 67.5 parts of a dark green crystalline powder are thus obtained, which can be freed from any adhering amine hydrochloride by stirring in water. It is then identical with the compound described in Example 4. If the process is carried out in chlorobenzene, instead of in o-dichlorobenzene, the same product is obtained, likewise with a good yield.

EXAMPLE 7

30 parts of a complex of the composition cobalt-phthalocyanine+2 pyridine+1 chloride, prepared by the reaction of chlorine with cobalt-phthalocyanine suspended in pyridine, are introduced at 80° C. into 200 parts by volume 1-amino-3-dimethylamino-propane. Stirring is continued at the same temperature for 15 minutes. After cooling to room temperature the product is filtered off with suction, and washed with water until neutral. After drying at 40° C. in a vacuum, there are obtained 31.2 parts of a green crystal powder which dissolves almost completely in lower alcohols, chloroform, formamide or dilute aqueous formic or acetic acid with a blue-green colour and is identical with the compound described in Example 4 also with regard to all its other properties.

EXAMPLE 8

(a) To the suspension of 20 parts CoPc in 150 parts by volume nitrobenzene a solution of 6 parts bromine in 10 parts by volume nitrobenzene is added dropwise at about 20° C. Stirring is continued for ½ hour and then at 40° C. for one hour. The product is filtered off with suction, thoroughly washed with nitrobenzene and benzene, and dried at 70° C. in a vacuum. There are obtained 25.3 parts of a dark-brown powder with a bromine content of 22.1% (calculated 21.85 for $C_{32}H_{16}N_8CoBr_2$) and a RZ of 77.2 (calculated 78.1).

(b) 25 parts dibromo-CoPc obtained according to Example 8(a) are introduced at 80° C. within 30 minutes into 200 parts by volume 1-amino-3-dimethylamino-propane. Stirring is continued at 80–85° C. for 15 minutes, then the mixture is allowed to cool. The product is filtered off with suction, washed with water until neutral and dried at 40° C. in a vacuum. There is obtained, according to analysis, a product which is similar to that described in Example 4, but contains, instead of chloride ion, the equivalent amount of bromide ion.

Calculated (percent): $C_{42}$, 58.95; $H_{43}$, 5.19; $N_{12}$, 19.66; Co, 6.88; Br, 9.33. Found (percent): $C_{42}$, 58.6; $H_{43}$, 5.4; $N_{12}$, 19.5; Co, 7.2; Br, 9.5.

If the 25 parts dibromo-CoPc are replaced with 25 parts of the iodine-containing CoPc complex described below, a green product is obtained, likewise in a good yield; apart from that this product contains as anion the iodine ion instead of the bromide ion (iodine content: found 14.5%, calculated 14.1%) it is completely similar to the product described above.

(c) 28.6 parts CoPc are heated in 200 parts by volume nitrobenzene with 10 parts iodine at 130° C. A further 5 parts iodine are added after one hour, and the mixture is kept at 130° C. for another hour. All of the blue CoPc crystals have then been transformed into finer brown crystals, as can easily be seen under the microscope. The product is filtered off with suction, washed with nitrobenzene, and benzene, and dried at 100° C. Yield: 35 parts of a dark olive-brown crystal powder with an iodine content of 19.4%.

(d) If the dibromo-CoPc is replaced with the corresponding amount of the phosphorus-containing CoPc complex described below, then the same product as described in Example 4 is obtained in very good yields. The phosphorus-containing CoPc complex was prepared in the following manner:

A suspension of 57.1 parts CoPc in 300 parts by volume nitrobenzene is heated with 50 parts phosphorus oxychloride at 135° C. for two hours. A further 15 parts phosphorus oxychloride are then added, the temperature is kept at 135° C. for another hour, and the mixture is stirred until cold. The product is filtered off with suction, thoroughly washed with nitrobenzene and benzene, and dried at 100° C. Yield: 75.2 parts of a black-green powder with a chlorine content of 10.2% and a phosphorus content of 4.4%.

EXAMPLE 9

57.1 parts CoPc in a finely divided form are stirred with 500 parts by volume 1-amino - 3 - dimethylamino-propane, 6 parts ammonium chloride are added, and the mixture is heated to 60–70° C. Ammonia escapes while diamine hydrochloride is formed in an amount equivalent to the ammonium chloride, and the CoPc is partially dissolved to give a blue solution, with formation of a CoPc-diamine complex. A slow current of air is then passed over the surface and stirring is continued at the above temperature. By this the colour of the solution becomes increasingly greener. Already after 10–20 minutes, samples exhibit, besides the opaque CoPc needles, green transparent prisms which have a strong red shine in reflected light. The needles of the starting material have completely disappeared after 5–8 hours. The time required depends on the distribution of the gas in the mixture and is substantially shorter with the use of oxygen than with the use of air. The mixture is cooled to 20–30° C., the crystal slurry is filtered off with suction and washed with about 1–2 parts by volume of the liquid diamine. The product is thoroughly filtered off with suction, then, after switching to another suction vessel, thoroughly washed with water, and dried at temperatures of up to 50° C. in dry circulating air or in a good vacuum. Yield of dark green crystal powder: about 78 parts corresponding to about 96% of theory, referred to a molar weight of 812; RZ: calculated 70.5, found 68.6 to 69.

The CoPc-dibase complex so obtained corresponds in respect of all its properties, particularly its easy solubility in 5% acetic acid, to the CoPc complex prepared from dichloro-CoPc with 1-amino-3-dimethylamino-propane according to Examples 4, 5 or 6.

When the process is carried out with the mixture described above in a closed apparatus with oxygen instead of air and the oxygen being supplied via a measuring device, then it is to be seen, provided that the stirring speed remains the same, that the oxygen absorption remains constant over a long period of time and then decreases. It comes to a standstill when CoPc is no longer present in the microscopic image.

(b) If the 1-amino - 3 - dimethylamino-propane is replaced with ethylene-diamine, then the reaction proceeds in virtually the same manner and with formation of a complex which likewise dissolves in dilute acetic acid with a bluish green colour.

EXAMPLE 10

30 parts CoPc are heated in 500 parts by volume 1-amino - 3 - dimethylamino-propane at 60–65° C. for one hour. The undissolved CoPc is filtered off and a vivid current of air is then passed through the clear blue solution at 60° C. The colour of the solution slowly changes from blue to green while long needle-shaped crystals are precipitated.

The product is filtered off with suction after about 5 hours, washed with 1-amino - 3 - dimethylamino-propane until the run-off is colourless, and finally with cyclohexane until free from amine. After drying the green felted needles at room temperature, there are obtained 16.7 parts with a RZ of 53.

The product is soluble in water, aqueous formic acid or acetic acid, lower alcohols, formamide or pyridine with a green colour.

If the air is replaced with pure oxygen, the colour of the solution also changes from blue to green, but without precipitation of a reaction product. This is only precipitated when halides, nitrates, acetates or carbonates of ammonia or of readily soluble amines, such as 1-amino-3-dimethylamino-propane are added.

This difference in behaviour between the use of air and pure oxygen as oxidising agent could be caused by the content of carbon dioxide in the air (cf. Example 11).

EXAMPLE 11

28.6 parts CoPc are stirred with 250 parts by volume 1-amino-3-dimethylamino-propane and 3 parts of gaseous carbon dioxide are pressed into the closed apparatus, whereupon the temperature of the dispersion rises to about 35° C. Without further heating or cooling, pure oxygen is then passed through the dispersion which is very well stirred. While the colour of the reaction mixture slowly changes from blue to green, long thin green needles are soon precipitated and these become thicker and shorter towards the end of the reaction. Their amount increases in parallel with the decrease of undissolved CoPc crystals. The starting material is completely converted after 10–12 hours. The reaction product is filtered off with suction, thoroughly washed with 1-amino-3-dimethylamino-propane, and then with cyclohexane until free from amine. After drying at 20–40° C. there remain 45.3 parts of a dark green, well crystallised dry product, RZ 57.1. The compound dissolves already in water, but more readily in dilute formic or acetic acid, lower alcohols, formamide or pyridine.

EXAMPLE 12

To the suspension of 32.5 parts dichloro-CoPc obtained according to Example 1(a) in 150 parts by volume dioxan 100 parts by volume ethylene-diamine are added with good cooling and very good stirring. The temperature should not exceed 15° C. Stirring is continued for 15 minutes, the product is filtered off with suction and thoroughly washed with dioxan and cyclohexane. After drying at 20–25° C., 29.85 parts of a green-blue product are obtained. As can be seen when the product is treated with dilute acetic acid, it is a mixture of two compounds one of which is blue and insoluble in dilute acetic acid. The other component can be separated by extraction with dilute acetic acid and precipitated from the deep blue-green solution by the addition of sodium chloride to give fine small rods.

EXAMPLE 13

(a) To the suspension of 25 parts dichloro-CoPc obtained according to Example 1(a) in 100 ml. methanol, and 25 parts by volume 1-amino-3-methylamino-propane are added dropwise. The temperature rises to 38° C. The mixture is cooled to room temperature and 100 parts by volume of water are added dropwise, whereupon the reaction product crystallises. After filtering off with suction, the product is washed with water until neutral and dried at 40° C. in a vacuum. The finely crystalline blue-green powder with a chlorine content of 4.4% (calculated: 4.39%) dissolves in lower alcohols, formamide and dilute formic or acetic acid with a greenish blue colour. RZ 67.3 (calculated: 71.6).

(b) A compound with very similar properties is by using 25 parts by volume 1-amino-3-cyclohexylamino-propane, instead of 25 parts by volume 1-amino-3-methylamino-propane.

EXAMPLE 14

(a) To the suspension of 65 parts dichloro-CoPc obtained according to Example 1(a) in 300 parts by volume o-dichlorobenzene 50 parts by volume bis-(3-aminopropyl)-amine are added. The mixture is heated to 80° C. and kept at this temperature for 10 minutes. After cooling to room temperature the product is filtered off with suction and thoroughly washed with water. After drying at 40° C. in a vacuum, there are obtained 31.7 parts of a dark green powder with a chlorine content of 9.4%. It dissolves very readily in simple alcohols and still dissolves readily in chloroform, formamide and dilute aqueous formic or acetic acid.

(b) If the 50 parts by volume bis-(3-aminopropyl)-amino are replaced with the same amount of bis-(3-aminopropyl)methylamine, a similar product is obtained.

EXAMPLE 15

64.2 parts dichloro-CoPc obtained according to Example 1 are heated in a mixture of 500 parts by volume glycol monomethyl ether and 100 parts by volume pyridine at 100–105° C. while stirring and cooling under reflux. The dark brown small crystals of the starting material completely disappear in the course of 5–7 hours, as can be observed under the microscope, and a suspension of coarse green-transparent prisms has formed. The product is filtered off with suction at 60° C., washed with glycol ether, then with water, and dried at 60–70° C. in a vacuum. Yield: about 62 parts of a dark crystal powder with a red shine. This dissolves in hot dimethyl formamide with a clear bluish green colour and recrystallises therefrom, after the addition of a little water, in the form of small crystals with a red shine.

A spread on paper with the aid of a drop of xylene is clear greenish blue. The physical and chemical properties lead to the conclusion that this product is identical with the reaction product of chlorine and CoPc in a pyridine suspension described in Example 7.

EXAMPLE 16

When 25 parts cobalt-phthalocyanine are stirred, in analogy with the reaction of copper-phthalocyanine described in U.S. patent specification No. 2,662,896, Example 1, with 22 parts bromine in 125 parts by volume methanol and 375 parts benzene for 15 hours, and the formed product is filtered off with suction and washed with methanol and benzene, then there are obtained, after drying, 33 parts of an almost black crystal powder with a bromine content of 9%; RZ 85.

25 parts of the product so obtained are introduced at 80° C. into 200 parts of 1-amino-3-dimethylamino-propane. The mixture is stirred until cold, the product is filtered off with suction and washed with water until neutral. After drying at 40° C. in a vacuum, there are obtained 19.5 parts of a blue-green crystalline product which is identical with the compound described in Example 5(a).

EXAMPLE 17

(a) In analogy with the instruction given in German patent specification No. 914,250, Example 27, a solution of 5.1 parts by weight nitric acid (d 1.15; 0.08 mole) in 50 parts by volume nitrobenzene is added with stirring and cooling to a suspension of 22.8 parts of technically pure CoPc (0.04 mole) in 150 parts by volume nitrobenzene cooled to 10° C. In spite of external cooling, the temperature rises to 18° C. and after the solution has temporarily turned violet, a finely crystalline dark brown compound is precipitated (brown - transparent short prisms under the microscope); after stirring for a short time, this is filtered off with suction, thoroughly washed with benzene, and dried at 80° C. Yield: 27.7 parts by weight. With 2 nitrate radicals entering into the CoPc, this amount corresponds almost exactly to theory.

(b) To a reaction mixture which has been obtained in the same manner but with the difference that the final product has not been isolated, but left in the resultant suspension, 17 parts by weight 1-amino-3-dimethylamino-propane are rapidly added at about 21° C. while stirring. The temperature rises to 38° C. and a deep blue-green solution is initially formed. Within a few minutes, the reaction product which is green-blue in the transmitted light and with a red shine in reflected light begins to crystallise. The bulk is precipitated by addition of 200 parts by volume methanol. Stirring is continued for ½ hour while cooling to 20° C., the product is filtered off with suction, washed with methanol until the initially dark-green run-off is only slightly greenish, and dried at 85° C. Yield: 16.6 g. of shiny steel-blue leaflets; triturating on paper with the addition of a little xylene gives a clear bluish green colour.

EXAMPLE 18

3 parts chlorine are passed into a suspension of 30 parts chlorine containing CoPc (chlorine content: 19.6%; average molecular weight: 720; prepared by chlorination of CoPc in an $AlCl_3/NaCl$ melt) in 150 parts by volume o-dichlorobenzene. Any excess chlorine which may be present is removed by passing a dry current of air through the suspension which is then heated to 50° C. Then 25 parts by volume 1-amino-3-dimethyl-amino-propane are added dropwise. The mixture is stirred until cold, the product is filtered off with suction, thoroughly washed with benzene, and dried at 40° C. in a vacuum. Yield: 32.8 g. (81.7% of theory, referred to an average molecular weight of 959). Analysis of the finely crystalline blue-green crystal powder gives a chlorine content of 17.6% (calculated 17.2%); the powder dissolves in lower alcohols, formamide, pyridine, aqueous formic or acetic acid with a blue-green colour.

EXAMPLE 19

To a suspension of 30 parts tetraphenyl-cobalt-phthalocyanine (prepared by heating 1-amino-3-imino-5- or -6-phenyl-isoindolenine with $CoCl_2$ in quinoline) in 300 parts by volume of dry dioxan, 6.5 parts by volume bromine are added dropwise at 15–20° C. within 30 minutes, whereupon a black-brown slurry is formed. Stirring is continued for one hour. 30 parts by volume 1-amino-3-dimethylamino-propane are then added dropwise at a temperature below 60° C. After stirring until cold 300 parts by volume of water are added, the product is filtered off with suction and washed with water until neutral. After drying at 40° C. in a vacuum, there are obtained 37.3 parts (94% of theory, referred to a molecular weight of 1160 for $C_{66}H_{60}N_{12}CoBr$) of a green, very fine-crystalline powder which dissolves in pyridine, nitrobenzene or diglycol monomethyl ether with an intense green colour. Analysis gives 7% bromine (calculated 6.9%) and 5.1% cobalt (calculated 5.1%).

We claim:

1. Process for the production of a complex compound of cobalt-phthalocyanine characterized in that a cobalt-phthalocyanine selected from the group consisting of cobalt-phthalocyanine, 4-phenyl substituted cobalt-phthalocyanine, halogen substituted cobalt-phthalocyanine and 4-lower alkoxy substituted phthalocyanine, is in any desired sequence treated with an oxidizing agent in the presence of an anion and with an amine at a temperature from about 15° C. to about 105° C. whereby for one mol cobalt-phthalocyanine should be used at least two moles of amine and at least one oxidation equivalent of an oxidizing agent wherein the oxidizing agent is a member selected from the group consisting of oxygen, air, halogen, thionylchloride, sulfurylchloride, sulfurmonochloride, sulfurdichloride, phosphorus pentachloride, phosphorus oxychloride, and nitric acid, and further characterized in that as amine is used at least one member selected from the group consisting of ammonia, methylamine, ethylamine, diethylamine, triethylamine, i-propylamine, n-butylamine, N-methyl-ethanolamine, ethanolamine, 1-dimethylamino-propanol-2, cyclohexylamine, benzylamine, N,N-dimethylbenzylamine, aniline, p-toluidine, p-anisidine, 2-aminothiazole, 2-aminopyridine, 1-amino-3-iminoisoindolenine, morpholine, piperidine, N-methyl-piperazine, pyridine, 2-methylimidazole, ethylenediamine, tetramethylethylene-diamine, 1,3 - diamino-propane, bis-(3-aminopropyl)-amine, bis-(3-amino-propyl)-methylamine and diamine of the formula

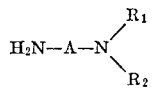

wherein denote

A: a straight $C_2$–$C_5$-alkylene radical or a branched $C_2$–$C_5$-alkylene radical,
$R_1$: hydrogen or a $C_1$–$C_4$-alkyl radical, and
$R_2$: a $C_1$–$C_4$-alkyl or a cyclohexyl radical.

2. Process according to claim 1 characterized in that the cobalt-phthalocyanine is treated in a first reaction step with said oxidizing agent, said anion being formed from the oxidizing agent during the oxidation reaction, and in a second reaction step with an amine.

3. Process according to claim 1 characterized in that the cobalt-phthalocyanine is treated in a first reaction step with an amine and in a second reaction step with said oxidizing agent at a temperature from about room temperature to about 65° C.

4. Process according to claim 3 wherein the oxidizing agent is selected from the group consisting of oxygen and air.

5. Process according to claim 4 characterized in that the cobalt-phthalocyanine is treated with an excess of a polyamine and the resultant dispersion is treated with air.

6. Process according to claim 5 characterized in that an ammonium salt or an amine salt is used which contains an anion selected from the group consisting of chloride, bromide, iodide, carbonate, acetate, hydroxyl and nitrate.

7. Process according to claim 1 wherein said amine is 1-amino-3-dimethylamino-propane.

8. Process according to claim 2 characterized in that the reaction mixture from the first reaction step is heated without isolation of the reaction product with a diamine of the formula

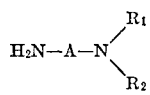

wherein denote

A: a straight $C_2$–$C_5$-alkylene radical or a branched $C_2$–$C_5$-alkylene radical,
$R_1$: hydrogen or a $C_1$–$C_4$-alkyl radical, and
$R_2$: a $C_1$–$C_4$-alkyl or a cyclohexyl radical, until the phthalocyanine reaction product from the first reaction step is no longer visible in the microscopic image.

9. Process according to claim 1 wherein a cobalt-phthalocyanine is treated in a first reaction step with an oxidizing agent to introduce, at the cobalt atom, a member selected from the group consisting of chlorine, nitrate, iodine, and bromine and in a second step with an amine whereby said introduced radicals represent the anions of the complex compound formed.

10. Process according to claim 9 wherein the oxidizing agent is selected from the group consisting of halogen, thionylchloride, sulfurylchloride, sulfurmonochloride, sulfuridichloride, phosphorus-pentachloride, phosphorus oxychloride and nitric acid, said anion being formed from the oxidizing agent during the oxidation reaction.

11. Process according to claim 9 wherein a polyamine is used as the amine and chlorine is the oxidizing agent.

12. Complex compound of the cobalt-phthalocyanine of the formula

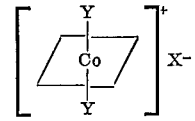

wherein Y denotes a member selected from the group consisting of ammonia, methylamine, ethylamine, diethylamine, triethylamine, i-propylamine, n-butylamine, N-methylethanolamine, 1-dimethylamino-propanol-2, ethanolamine, cyclohexamine, benzylamine, N,N-dimethylbenzylamine, aniline, p-toluidine, p-anisidine, 2-aminothiazole, 2-aminopyridine, 1-amino-3-imino-isoindolenine, morpholine, piperidine, N-methyl-piperazine, pyridine, 2-methylimidazole, ethylene-diamine, tetramethylethylene-diamine, 1,3-diamino-propane, bis-(3-aminopropyl)-amine, bis-(3-aminopropyl)-methylamine and diamines of the formula

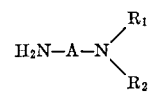

wherein denote

A: a straight $C_2$–$C_5$-alkylene radical or a branched $C_2$–$C_5$-alkylene radical,
$R_1$: hydrogen or a $C_1$–$C_4$-alkyl radical, and
$R_2$: a $C_1$–$C_4$-alkyl or a cyclohexyl radical,
$X^-$ is an anion and, the rhomb 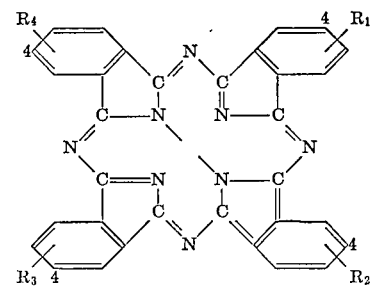 denotes in $R_1$, $R_2$, $R_3$ and $R_4$ independently from one another stand for a member selected from the group consisting of hydrogen, phenyl, halogen and lower alkoxy with the provision that if $R_1$, $R_2$, $R_3$ or $R_4$ is phenyl or lower alkoxy, it is in the 4-position on the benzene nucleus.

13. A cobalt-phthaocyanine complex compound of claim 12 wherein $X^-$ is a member selected from the group consisting of chloride, bromide, iodide, hydroxy, nitrate, hydrogen carbonate and acetate.

14. A cobalt-phthalocyanine complex compound of claim 12 wherein Y denotes a diamine of the formula

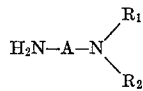

wherein denote

A: a straight $C_2$–$C_5$-alkylene radical or a branched $C_2$–$C_5$-alkylene radical, $R_1$: hydrogen or a $C_1$–$C_4$-alkyl radical, and $R_2$: a $C_1$–$C_4$-alkyl or a cyclohexyl radical.

15. A cobalt-phthalocyanine complex compound of claim 14 wherein Y denotes 1-amino-3-dimethylaminopropane.

16. A complex compound of cobalt phthalocyanine of claim 12 wherein the rhomb

denotes

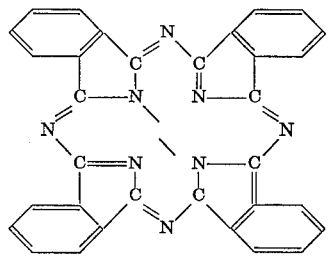

wherein at least one of the benzene rings is unsubstituted or substituted by at least one chlorine atom.

No references cited.

HENRY R. JILES, Primary Examiner

H. I. MOATZ, Assistant Examiner

U.S. Cl. X.R.

260—247.5 B, 293 DC, 296 D, 296 R, 306.8 R, 309.6; 8—1 XA, 4, 54.2; 106—22

UNITED STATES PATENT OFFICE
CERTIFICATE OF CORRECTION

Patent No. 3,636,040　　　　　　　Dated Jan. 18, 1972

Inventor(s) Vollmann, Heinrich et al.

It is certified that error appears in the above-identified patent and that said Letters Patent are hereby corrected as shown below:

| COLUMN | LINE | ERROR |
|---|---|---|
| 3 | 27 | "amminia" should read ---ammonia--- |

12, form., lower right ring " 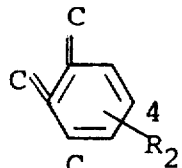 " should be --- 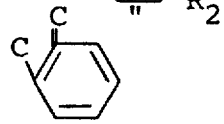 ---

14, form., lower right ring " 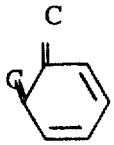 " should be --- 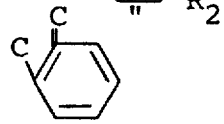 ---

Signed and sealed this 19th day of September 1972.

(SEAL)
Attest:

EDWARD M. FLETCHER, JR.　　　　　ROBERT GOTTSCHALK
Attesting Officer　　　　　　　　Commissioner of Patents